Nov. 7, 1961  F. R. HILL  3,007,339
ACOUSTIC FLOW METERS
Filed May 16, 1957
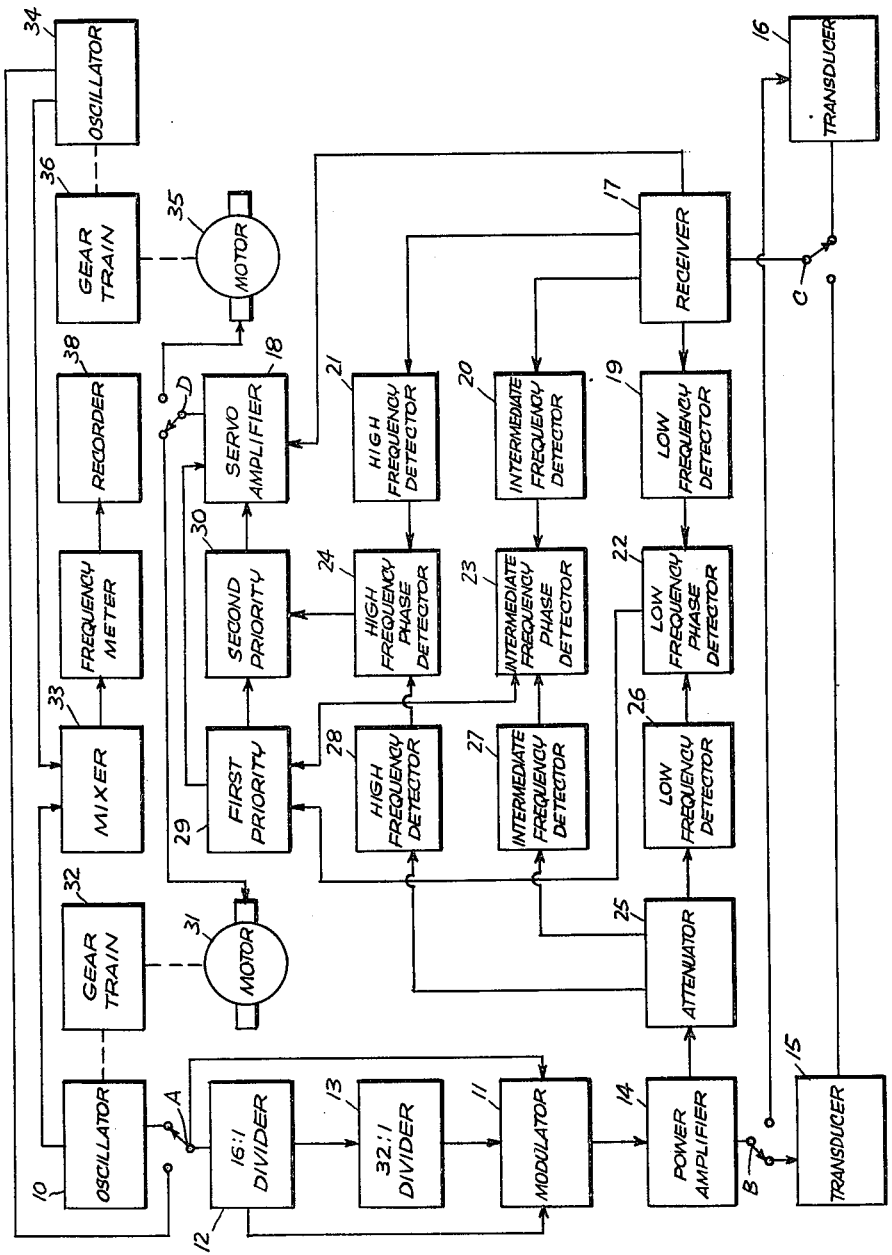
INVENTOR
FRANK ROBERT HILL
BY Elmer J. Gorn
ATTORNEY

United States Patent Office 3,007,339
Patented Nov. 7, 1961

3,007,339
ACOUSTIC FLOW METERS
Frank Robert Hill, South Lincoln, Mass., assignor to Raytheon Company, a corporation of Delaware
Filed May 16, 1957, Ser. No. 659,711
7 Claims. (Cl. 73—194)

This invention relates to the measurement of motion and particularly to the measurement of the rate of the relative motion between a fluid and a solid body. This invention is particularly adaptable to a system utilizing two frequencies for the determination of velocity such as that described in my co-pending application entitled "Measurement of Relative Velocity Between Fluid and Solid Bodies," Serial Number 477,572, filed December 24, 1954, now abandoned.

In this invention, the acoustic flow meter operates on the principle that the velocity of acoustic transmission between two fixed points in a moving medium is equal to the algebraic sum of velocity of propagation in the medium and the components of velocity of flow of the medium in a line joining the two fixed points. The difference between the upstream and downstream velocity of acoustic transmission as described is therefore twice the velocity of flow of the medium in a line joining the two points. This invention determines the upstream and downstream velocity of acoustic transmission in terms of two frequencies in a manner described in my previously referred-to co-pending application and of a greatly improved accuracy. In this invention, opposing transducers are not directly across the stream from each other, but rather at an angle defined by a line through the transducers and in the direction of flow of the medium. The frequencies $f_1$ (downstream) and $f_2$ (upstream) are arbitrarily assigned and are automatically adjusted to give the same number of wavelengths, $m$, between transducers 1 and 2. The expression for the frequencies $f_1$ and $f_2$ are as follows:

(1) $$f_1 = \frac{c + v \cos \theta}{\lambda} = \frac{m(c + v \cos \theta)}{d}$$

(2) $$f_2 = \frac{c - v \cos \theta}{\lambda} = \frac{m(c - v \cos \theta)}{d}$$

Where $f_1$ = the frequency for downstream transmission required to produce $m$ wavelengths between transducers 1 and 2.
$f_2$ = the frequency for upstream transmission required to produce $m$ wavelengths between transducers 1 and 2.
$d$ = distance between transducers 1 and 2.
$m$ = number of wavelengths in distance $d$.
$c$ = propagation velocity of sound.
$\lambda$ = wavelength of sound.
$v$ = velocity of flow.
$\theta$ = angles between a line through the transducers and the direction of flow.

By subtracting Equation 2 from Equation 1 we obtain:

(3) $$f_1 - f_2 = \frac{2mv \cos \theta}{d}$$

and solving for $v$ in Equation 2 we obtain:

(4) $$v = \frac{d(f_1 - f_2)}{2m \cos \theta}$$

In the relationship shown above, $d$, $m$, and $\cos \theta$ are constants with the variable $(f_1 - f_2)$ being directly proportional to the flow of velocity. The requirements for proper measurement of flow of velocity require the determining of the values of the constants and the measuring and recording of the variables. The distance between transducers $d$ may be measured very accurately by using standard surveying techniques. The angle $\theta$ between sound transmission and the direction of flow is determined at the place and time of installation of the transducers and will be constant for a given installation. The remaining constant for evaluation is $m$, the number of acoustic wavelengths in the transmission path. Since the water temperatures in a river may vary, for example from near freezing to the middle seventies, and further, since suspended and dissolved materials may be present in the water in varying amounts, the sound propagation velocity may be as low as 4600 feet per second and as high as 5000 feet per second which means the average velocity is about 4800 feet per second ±200 feet per second. This wide variation of the propagation constant places a severe restriction on the maximum value of $m$, which will be explained below. For purposes, of example, a properly designed precision phase detector is capable of reliable operation over a range of approximately ±150 degrees with an accuracy near zero phase of about ±1 degree.

The phase shift between opposing transducers is equal to:

(5) $$\phi = 360 \cdot m$$

where $\phi$ is the phase shift in degrees between transducers. Since $d = m \cdot \lambda$ and $$\lambda = \frac{c}{f}$$

it can be shown that by substituting both of these expressions in Equation 5 will produce the following relationship for $\phi$ in terms of $d$, $f$ and $c$:

(6) $$\phi = \frac{360 \cdot d \cdot f}{c}$$

If the propagation frequency is $c + \Delta c$, the frequency $f$ will be adjusted to hold the phase shift $\phi$ at the equilibrium value of $360 \cdot m$, which is expressed as follows:

(7) $$\phi = \frac{360 \cdot d \cdot (f + \Delta f)}{c + \Delta c}$$

In order to consider the extreme conditions under which the equipment will be operated, which conditions can be shown to exist if the equipment is turned off in this condition, and now considering that the equipment is placed in the extreme opposite condition wherein the propagation frequency is $c - \Delta c$, it can be shown that the initial phase will be:

(8) $$\phi + \Delta \phi = \frac{360 \cdot d \cdot (f + \Delta f)}{c - \Delta c} = \phi \left[\frac{c + \Delta c}{c - \Delta c}\right]$$

this equation is equal to:

(9) $$1 + \left(\frac{\Delta \phi}{\phi}\right) = \frac{1 + \left(\frac{\Delta c}{c}\right)}{1 - \left(\frac{\Delta c}{c}\right)} \approx 1 + \frac{2\Delta c}{c}$$

(10) $$\frac{\Delta \phi}{\phi} = \frac{2\Delta c}{c}$$

It is now possible to solve for the allowable phase shift $\phi$ since by definition it is known that $\Delta \phi$ is limited to ±150 degrees and $c$, which is the average velocity, will be 4800 feet per second and $\Delta c$, as explained above, is limited to ±200 feet per second. Solving for $\phi$ in Equation 10 shows that the phase shift angle $\phi$ must be limited to 1800 degrees in order to obtain the stated accuracy. In order to find the effect on $v$ which is the velocity of flow of the medium being measured caused by an error in phase shift $\phi$, it is necessary to differentiate Equation 1 with respect to phase shift $\phi$ which becomes:

$$(11) \qquad \cos\theta\, dv = \frac{-360 \cdot df_1}{\phi^2} \cdot d\phi$$

and since the following relationships are known to exist $$\frac{360 df_1}{\phi} \approx c$$

the phase shift can be solved for as follows:

$$(12) \qquad \phi = \frac{c}{\cos\theta} \cdot \frac{d\phi}{dv}$$

By assuming the $\cos\theta$ is equal to 0.707 and $c$ is equal to 4800, and further by requiring an accuracy from the system in the order of $\pm 0.01$ feet per second and having assumed the accuracy of the phase detector to be $\pm 1$ degree, it is now possible to solve for the minimum possible phase shift allowed in this system by substituting in Equation 12:

$$(13) \qquad \phi = \frac{4800}{0.707} \cdot \frac{1°}{0.01} = 680{,}000°$$

In this invention, the problem of providing the small number of degrees (1800) needed for accurate determination of the value of $m$ and the large number of degrees (680,000) needed to provide accurate determination of the two frequencies over the wide operating range of $c \pm v$ has been solved by the transmission of a plurality of frequencies from one transducer to the other wherein each of the plurality of frequencies is an exact multiple of the main transmitted carrier frequency and where their zero crossing must coincide with the zero crossing of the transmitted carrier frequency. The main or carrier frequency, as in all acoustic systems, must be high enough to give the transducer good vertical directivity with a reasonable length, whereas the plurality of multiple frequencies or modulator frequencies should be an exact multiple of the main frequency, since they are used to obtain a lower value for $m$ in order to extend the range of operation without introducing ambiguities. Single side band transmission may be used to limit the response band of the transducer and to allow more power to be transmitted to the side band. In the embodiment to be described, the modulator frequency is made a constant submultiple of the main or carrier frequency. In a system utilizing this invention, it is possible either by the process of division of the carrier frequency to produce the modulator frequencies or by multiplication of the modulator frequencies produce the main or carrier frequency.

Further objects and advantages of this invention will be made more apparent as the description progresses. Reference now being made to the accompanying drawing where there is shown in block diagram form a system for measuring fluid flow suitable for installation on a river, and where a main or carrier frequency and modulation frequencies are transmitted from a first transducer to a second transducer and where a second main or carrier frequency and suitable modulation frequencies are transmitted from said second transducer to said first transducer on a time-sharing basis. The block diagram to be described is an embodiment of the invention that will solve the problem described earlier in the specification. For this specific problem, the choice of carrier frequencies is determined by the needed phase shift of 680,000° and the allowed phase shift of only 1,800°. The ratio is approximately 378:1, and, since the phase detectors have a stated accuracy $\pm 1°$ and a range of $\pm 150°$, and hence a ratio of 150:1, it can be seen that a third frequency must be provided which is intermediate both the high and low frequencies. The carrier frequency needed is determined by the average velocity of sound and the allowable phase shift. In the accompanying figure, oscillator 10 generates a carrier frequency of 35.2 kilocycles, the output of which is fed to both a modulator 11 and also to a 16:1 divider circuit 12 that produces a 2,200 cycle per second signal which, in turn, feeds a 32:1 divider circuit 13 which produces a 68.7 cycle per second signal. The output of divider 13, which produces the 68.7 cycle per second signal, also feeds modulator 11 as does the output of divider 12 that produces the 2,200 cycle per second signal. In operation, the carrier signal for the main frequency of 35.2 kilocycles is produced in oscillator 10, whereas the intermediate signal from divider 12 and the low frequency signal from divider 13 are applied as amplitude modulation signals upon the carrier signal in modulator 11. The signal from modulator 11 is fed through a power amplifier 14 where it is amplified for transmission before being fed to transducer 15. The acoustic signal is beamed directly through the medium being measured to a suitably-placed transducer 16 where the signal is received and fed to receiver 17 where the carrier signal and modulating signals are amplified. Since it may be possible under certain conditions for the acoustic signal to be completely blocked, which condition may be caused by floating obstacles or even possibly deep wakes generated by tug boats, receiver 17 provides a minimum level gate which is connected to a servo amplifier 18 in such a manner that said servo amplifier 18 is disabled during the time when receiver 17 receives no usable signal from the receiver transducer 16. This insures that only reliable information will be fed to the recorder. The individual modulation frequencies at the output of receiver 17 are fed to suitable detectors such as low-frequency detector 19, intermediate-frequency detector 20 and high-frequency detector 21 where the individual modulating frequencies are detected and amplified. In order to determine the phase difference between the transmitter frequency and the received frequency for each of the frequencies involved, the signal from low-frequency detector 19 is fed to a low-frequency phase detector 22 and in a similar manner the signal from intermediate-frequency detector 20 is fed to an intermediate-frequency phase detector 23 and the signal from high-frequency detector 21 to a high-frequency phase detector 24. In order to provide a reference from which to determine the phase shift for these three received signals, a portion of the transmitted signal is fed from power amplifier 14 to an attenuator circuit 25 which, in turn, feeds the signal to a low-frequency detector and amplifier 26 where the low-frequency signal being transmitted is detected and amplified and fed to low-frequency phase detector 22 in order to allow comparison of the phase difference between the transmitted signal and the received signal to be made. In a similar manner, attenuator 25 also feeds an intermediate-frequency detector 27 which is connected to and serves as a basis for intermediate-frequency phase detector 23 to compare the phase difference for the intermediate-frequency phase signal that is transmitted and with that received. Similarly, attenuator 25 is connected to high-frequency detector 28 which is connected to high-frequency phase detector 24 and performs the same functions as detectors 22 and 23.

The outputs of phase detectors 22 and 23 are fed to a first priority circuit 29, that, in normal operation, will select the output of low-frequency phase detector 22 and will feed said signal directly to servo amplifier 18 and at the same time continually test the output of both the low-frequency detector 22 and intermediate-frequency phase detector 23 in such a manner that when the output of the low-frequency phase detector falls below a level equivalent to approximately 4°, the first priority circuit 29 will select the output of the intermediate-frequency phase detector 23 and feeds this signal to a second priority circuit 30, while at the same time disabling the circuit directly fed to servo amplifier 18. High-frequency detector 24 is also fed to second priority circuit 30, which circuit is normally disabled unless there is an output signal from first priority circuit 29. Should a signal appear at the input of second priority circuit 30 from first priority circuit 29, said signal would be indicative of an output from intermediate frequency phase detector 23 and, under normal conditions, this signal will be fed directly to servo amplifier 18 while at the same time second priority circuit 30 will continually test this input signal against the input signal from high frequency detector 24 in a similar manner as first priority circuit 29, and, when the output of the intermediate frequency phase detector from first priority circuit 29 falls below a level equivalent to approximately 8 degrees, the output of high frequency phase detector 24 is selected and fed directly to servo amplifier 18, whereupon the highest degree of accuracy is obtained. If at any time a change in phase occurs which is more than an 8 degree error in the intermediate frequency phase detector 23, then second priority circuit 30 will automatically revert control of servo amplifier 18 from the high frequency phase detector 24 back to the intermediate frequency phase detector 23 until the frequency has been sufficiently adjusted so that no ambiguity can enter in the operation of the high frequency phase detector 24.

Servo amplifier 18 controls a motor drive unit 31 which is mechanically linked through a gear train 32 to oscillator 10, thereby providing accurate control of the carrier frequency generated in oscillator 10, which frequency is $f_1$ as described in Equation 1. The signal generated in oscillator 10 is also fed to a mixer 33.

The description up to this point has been concerned with only the first mode of operation which includes the transmitting of a signal from transducer 15 that is received by transducer 16. As explained previously, this will produce only the $f_1$ frequency and in order to produce $f_2$ frequency, which has been arbitrarily defined as the upstream frequency in Equation 2, it would be necessary to provide a complete duplicate of the apparatus described herein. It has been discovered that proper operation will occur if suitable gating circuits are used which time-share the equipment in such a manner that in the first instance transducer 15 transmits and transducer 16 receives, and in the second instance, transducer 16 transmits and transducer 15 receives. With the equipment used in this fashion, it is only necessary to duplicate the carrier oscillator and associated motor control units and provide the necessary gating circuits necessary to cause the switching actions to take place which represent a very definite savings in dollar value of equipment necessary to practice this invention.

In the accompanying drawing, the referred-to gating circuits that allow the time-sharing of the equipment are illustrated as single-pole, double-throw switches, such as switch A located at the output of oscillator 10, which switch, when operated, disables the output of oscillator 10 and inserts the output of oscillator 34, which is similar to that of oscillator 10, into divider circuit 12 and associated equipment. Single-pole, double throw switch B is located at the output of power amplifier 14, and when operated has the effect of transferring the transmitted power from power amplifier 14 to transducer 16, thereby making said transducer 16 the transmitting transducer. Single-pole, double-throw switch C, which is located at the input to receiver 17, when operated, has the effect of disconnecting transducer 16 from receiver 17 and connecting said transducer 15 to said receiver, thereby making transducer 15 the receiving transducer. Switch D is a single-pole, double-throw switch in the output of servo amplifier 18 and when operated disconnects the output of said servo amplifier from controlling motor drive unit 31 and instead feeds the output of said servo amplifier 18 to drive motor 35 which mechanically controls oscillator 34 through gear train 36. In this manner, with switches A, B, C, and D operated, transducer 16 will be transmitting and transducer 15 will be the receiving transducer and which will cooperate with the associated circuit in the same manner as heretofore described, all for the specific purpose of determining the frequency in oscillator 34, which frequency will be $f_2$, as described in Equation 2. The output of oscillator 34 is also fed to mixer 33 where the difference frequency between $f_1$ from oscillator 10 and $f_2$ from oscillator 34 is derived. This difference frequency is measured by a frequency meter 37 which is connected to the output of mixer 33, which difference frequency is automatically recorded on a suitable recorder 38.

This completes the description of the embodiments of this invention described herein. However, many modifications and advantages will be apparent to persons skilled in the art without departing from the spirit and scope of this invention. For example, in certain installations it might be more advantageous to use two complete duplicated systems each having a separate transmitting transducer and a separate receiving transducer rather than use the gating switches illustrated and described in this embodiment. Further, it is entirely conceivable that four separate systems may be used as described and illustrated herein with the only difference being that two of the systems would be placed at right angles in the medium to be measured with respect to the other two systems. In this manner it would be possible in harbors and rivers to measure both magnitude and direction of flow. Accordingly, it is desired that this invention not be limited to the particular details of the embodiment disclosed herein except as defined by the appended claims.

What is claimed is:

1. Means for measuring the rate of relative motion, as between fluid and solid bodies, including a first transmitting and receiving means positioned at a first predetermined location on said solid body, a second transmitting and receiving means positioned at a second predetermined location on said solid body, said first and said second locations thereby defining a direction making a predetermined angle other than 90° with respect to the direction of flow of said fluid, means for generating a first carrier signal having a first predetermined frequency, means for generating a first plurality of additional signals each having a frequency which is a submultiple of said first carrier frequency, means for generating a second carrier signal having a second predetermined frequency, means for generating a second plurality of additional signals each having a frequency which is a submultiple of said second carrier frequency, said first transmitting means transmitting said first carrier signal and said first plurality of additional frequencies from said first location to said receiving means at said second location, said second transmitting means transmitting said second carrier signal and said second plurality of additional signals from said second location to said receiving means at said first location, said transmission paths extending through said fluid, means responsive to said received signals and said transmitted signals for adjusting the frequencies of said carrier signals to provide the same number of wavelengths between said first and second locations, and means for comparing the frequency of said first carrier signal with the frequency of said second carrier signal for providing a signal proportional to said rate of relative motion.

2. Means for measuring the rate of relative motion, as between fluid and solid bodies, including a first transmitting and receiving means positioned at a first predetermined location on said solid body, a second transmitting and receiving means positioned at a second predetermined location on said solid body, said first and said second locations thereby defining a direction making a predetermined angle other than 90° with respect to the direction of flow of said fluid, means for generating a first carrier signal having a first predetermined frequency, means for generating a first plurality of additional signals each having a frequency which is a submultpile of said first carrier frequency, means for generating a second carrier signal having a second predetermined frequency, means for generating a second plurality of additional signals each having a frequency which is a submultiple of said second carrier frequency, said first transmitting means transmitting said first carrier signal and said first plurality of additional frequencies from said first location to said receiving means at said second location, said second transmitting means transmitting said second carrier signal and said second plurality of additional signals from said second location to said receiving means at said first location, said transmission paths extending through said fluid, means for comparing each of said received signals with its corresponding transmitted signal, means responsive to the output of said comparing means for adjusting the frequencies of said carrier signals to provide the same number of wavelengths between said first and second locations, and means for comparing the frequency of said first carrier signal with the frequency of said second carrier signal for providing a signal proportional to said rate of relative motion.

3. Means for measuring the rate of relative motion, as between fluid and solid bodies, including a first transmitting and receiving means located at a first predetermined point on said solid body, a second transmitting and receiving means located at a second predetermined point on said solid body, said first and said second points thereby defining a line making a predetermined angle other than 90° with respect to the direction of flow of said fluid, means for generating a first carrier signal having a first predetermined frequency, means for generating a first plurality of additional signals each having a frequency which is a submultiple of said first carrier frequency, means for generating a second carrier signal having a second predetermined frequency, means for generating a second plurality of additional signals each having a frequency which is a submultiple of said second carrier frequency, said first transmitting means transmitting said first carrier signal and said first plurality of additional frequencies in a downstream direction from said first point to said receiving means at said second point, said second transmitting means transmitting said second carrier signal and said second plurality of additional signals in an upstream direction from said second point to said receiving means at said first point, said signals being transmitted downstream on a time-sharing basis with said signals being transmitted upstream, said transmission paths extending through said fluid, means for comparing each of said received signals with its corresponding transmitted signal, means responsive to the output of said comparing means for adjusting the frequencies of said carrier signals to provide the same number of wavelengths between said first and second points and means for comparing the frequency of said first carrier signal with the frequency of said second carrier signal for providing a signal proportional to said rate of relative motion.

4. Means for measuring the rate of relative motion, as between fluid and solid bodies, including a first transmitting and receiving means positioned at a first predetermined location on said solid body, a second transmitting and receiving means positioned at a second predetermined location on said solid body, said first and said second locations thereby defining a direction making a predetermined angle other than 90° with respect to the direction of flow of said fluid, means for generating a first carrier signal having a first predetermined frequency, means for generating a first plurality of modulating signals each having a frequency which is a submultiple of said first carrier frequency, means for generating a second carrier signal having a second predetermined frequency, means for generating a second plurality of modulating signals each having a frequency which is a submultiple of said second carrier frequency, said first transmitting means transmitting said first carrier signal and said first plurality of modulating frequencies from said first location to said receiving means at said second location, said second transmitting means transmitting said second carrier signal and said second plurality of modulating signals from said second location to said receiving means at said first location, said transmission paths extending through said fluid, means for comparing each of said received signals with its corresponding transmitted signal, means responsive to the output of said comparing means for adjusting the frequencies of said carrier signals to provide the same number of wavelengths between said first and second locations, and means for comparing the frequency of said first carrier signal with the frequency of said second carrier signal for providing a signal proportional to said rate of relative motion.

5. Means for measuring the rate of relative motion, as between fluid and solid bodies, including a first transmitting and receiving means positioned at a first predetermined location on said solid body, a second transmitting and receiving means positioned at a second predetermined location on said solid body, said first and said second locations thereby defining a direction making a predetermined angle other than 90° with respect to the direction of flow of said fluid, means for generating a first carrier signal having a first predetermined frequency, means for generating from said first carrier signal a first plurality of additional signals each having a frequency which is a submultiple of said first carrier frequency, means for generating a second carrier signal having a second predetermined frequency, means for generating from said second carrier signal a second plurality of additional signals each having a frequency which is a submultiple of said second carrier frequency, said first transmitting means transmitting said first carrier signal and said first plurality of additional frequencies from said first location to said receiving means at said second location, said second transmitting means transmitting said second carrier signal and said second plurality of additional signals from said second location to said receiving means at said first location, said transmission paths extending through said fluid, means for comparing each of said received signals with its corresponding transmitted signal, means responsive to the output of said comparing means for adjusting the frequencies of said carrier signals to provide the same number of wavelengths between said first and second locations, and means for comparing the frequency of said first carrier signal with the frequency of said second carrier signal for providing a signal proportional to said rate of relative motion.

6. Means for measuring the rate of relative motion, as between fluid and solid bodies, including a first transmitting and receiving means positioned at a first predetermined location on said solid body, a second transmitting and receiving means positioned at a second predetermined location on said solid body, said first and said second locations thereby defining a direction making a predetermined angle other than 90° with respect to the direction of flow of said fluid, means for generating a first carrier signal having a first predetermined frequency, means for generating a first plurality of additional signals each having a frequency which is a submultiple of said first carrier frequency, means for generating a second carrier signal having a second predetermined frequency, means for generating a second plurality of additional signals each having a frequency which is a submultiple of said second carrier frequency, said first transmitting means transmitting said first carrier signal and said first plurality of additional frequencies from said first location to said receiving means at said second point, said second transmitting means transmitting said second carrier signal and said second plurality of additional signals from said second location to said receiving means at said first location, said transmission paths extending through said fluid, means for comparing the phase of each of said received signals with its corresponding transmitted signal, means responsive to the output of said phase comparing means for adjusting the frequencies of said carrier signals to provide the same number of wavelengths between said first and second locations, and means for comparing the frequency of said first carrier signal with the frequency of said second carrier signal for providing a signal proportional to said rate of relative motion.

7. Means for measuring the rate of relative motion, as between fluid and solid bodies, including a first transmitting and receiving means positioned at a first predetermined location on said solid body, a second transmitting and receiving means positioned at a second predetermined location on said solid body, said first and said second locations thereby defining a direction making a predetermined angle other than 90° with respect to the direction of flow of said fluid, means for generating a first carrier signal having a first predetermined frequency, means for generating a first plurality of additional signals each having a frequency which is a submultiple of said first carrier frequency, means for generating a second carrier signal having a second predetermined frequency, means for generating a second plurality of additional signals each having a frequency which is a submultiple of said second carrier frequency, said first transmitting means transmitting said first carrier signal and said first plurality of additional frequencies from said first location to said receiving means at said second location, said second transmitting means transmitting said second carrier signal and said second plurality of additional signals from said second location to said receiving means at said first location said transmission paths extending through said fluid, means for comparing the phase of each of said received signals with its corresponding transmitted signal, means responsive to the smallest phase difference of the highest frequency transmitted and received for adjusting the frequencies of said carrier signals to provide the same number of wavelengths between first and second locations, and means for comparing the frequency of said first carrier signal with the frequency of said second carrier signal for providing a signal proportional to said rate of relative motion.

References Cited in the file of this patent

UNITED STATES PATENTS

| | | |
|---|---|---|
| 2,480,646 | Grabau | Aug. 30, 1949 |
| 2,708,366 | Blocher et al. | May 17, 1955 |
| 2,724,269 | Kalmus | Nov. 22, 1955 |
| 2,826,912 | Kritz | Mar. 18, 1958 |
| 2,865,196 | Bordenave et al. | Dec. 23, 1958 |